Figure 1:
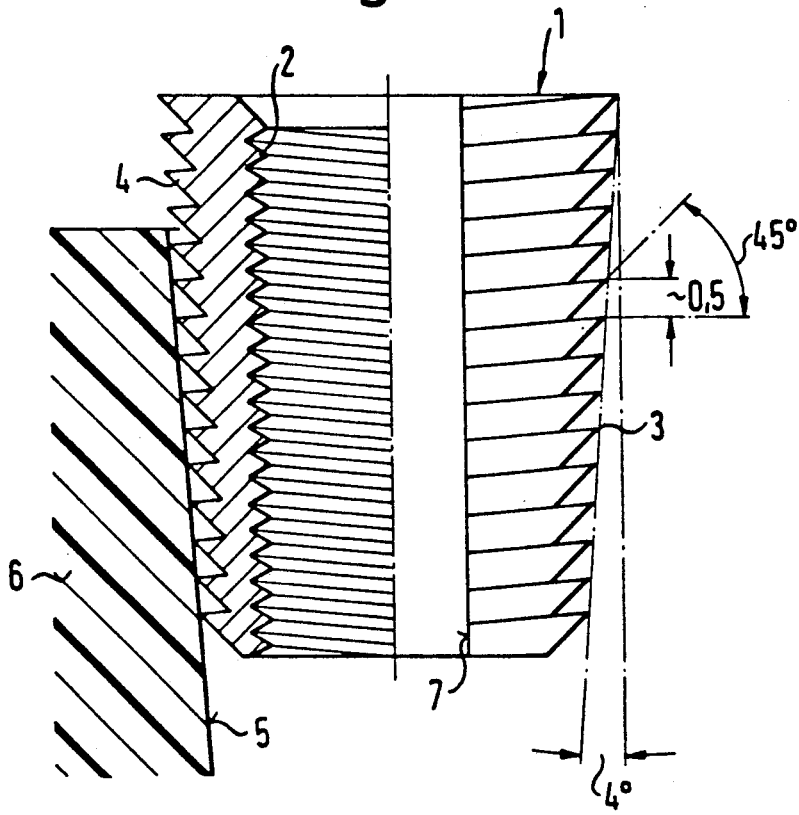

United States Patent [19]
Kobusch

[11] Patent Number: 5,131,795
[45] Date of Patent: Jul. 21, 1992

[54] SCREW THREADED INSERT

[75] Inventor: Klaus Kobusch, Bielefeld, Fed. Rep. of Germany

[73] Assignee: Bollhoff & Co. GmbH & Co. KG, Bielefeld, Fed. Rep. of Germany

[21] Appl. No.: 636,711

[22] Filed: Jan. 2, 1991

[30] Foreign Application Priority Data

Jan. 12, 1990 [DE] Fed. Rep. of Germany ....... 4000782

[51] Int. Cl.⁵ ............................................. F16B 37/12
[52] U.S. Cl. ..................................... 411/178; 411/180; 411/418; 411/489; 411/968
[58] Field of Search ............... 411/178, 179, 180, 411, 411/426, 417, 424, 418, 378, 419; 44/377, 371, 429, 369, 368, 542, 903, 259, 968, 490, 489

[56] References Cited

U.S. PATENT DOCUMENTS

| | | | |
|---|---|---|---|
| H339,218 | 7/1982 | Navarre | 411/419 |
| 1,107,544 | 8/1914 | Ogden | 411/180 X |
| 1,227,627 | 5/1917 | Kennedy | 411/178 |
| 2,079,692 | 5/1937 | Lapointe | 411/426 X |
| 2,609,604 | 9/1952 | Sprague | 411/419 X |
| 2,967,448 | 1/1961 | Hallock | 411/490 |
| 3,498,353 | 3/1970 | Barry | 411/180 |
| 3,530,921 | 9/1970 | Ernest | 411/259 |
| 3,662,643 | 5/1972 | Scheffer | |
| 3,822,902 | 7/1974 | Maurer et al. | 411/418 X |
| 3,834,438 | 9/1974 | Ziaylek, Jr. | 411/113 |
| 4,046,181 | 9/1977 | Barnsdale | 411/180 |

FOREIGN PATENT DOCUMENTS

| | | |
|---|---|---|
| 0272020 | 6/1988 | European Pat. Off. . |
| 66047 | 3/1969 | Fed. Rep. of Germany . |
| 7128297 | 6/1973 | Fed. Rep. of Germany . |
| 2355166 | 5/1975 | Fed. Rep. of Germany . |
| 2358577 | 2/1978 | France ................ 411/178 |

Primary Examiner—Rodney M. Lindsey
Attorney, Agent, or Firm—Emrich & Dithmar

[57] ABSTRACT

A screw threaded insert adapted to be fitted in a bore of a workpiece made of thermoplastic material. The screw threaded insert is externally tapered at an angle of about four (4) degrees and is defined externally with a thread of approximately equal pitch and depth, and of saw toothed shape. The insert is also threaded internally for receiving a bolt. A pair of cutting slots is also provided.

7 Claims, 1 Drawing Sheet

SCREW THREADED INSERT

BACKGROUND OF THE INVENTION

The present invention relates to a metallic insert including a conical screw threaded outer face adapted to be fitted in a bore of a work-piece made of thermoplastic material, or the like.

Known metallic inserts adapted to be fitted in a work-piece of soft material regularly have raised portions and indentations on the outer face which are arranged such that the axial pulling out force for the insert is as high as possible and that the insert is locked against rotation. Known threaded inserts (German No. 23 55 166) are of conical shape for mounting in a heat and pressureprocess or, respectively in a ultrasonic process. Other known threaded inserts (European No. 027 20 20) are of cylindrical shape with a screw thread for cutting its own thread in a cylindrical bore of the work-piece.

OBJECT OF THE INVENTION

It is an object of the invention to provide a threaded insert which is designed to have an improved fit in the work-piece and which insert may be installed in the work-piece by a heat and pressure process, by ultrasonic means or by screwing in.

BRIEF SUMMARY OF THE INVENTION

The object is achieved, according to the invention, in that the thread is a fine saw tooth-shaped thread, that the receiving bore in the work-piece has the same tapering angle as the insert, that the diameter of the receiving bore relative to the diameter of the insert as well as the pitch and the thread depth are selected such that the spaces between the threads are filled out at least almost totally when the insert is installed in the bore.

In screwing the insert in the bore the thread cuts itself in the plastic material and the material displaced by the thread flows into the spaces between the thread profile to fill the spaces as far as possible, preferably completely. When installing the insert in a heat-pressure-process the molten plastic material flows into the spaces to obtain a corresponding effect.

The thread is defined by some kind of fine thread having a relatively low pitch, in particular a pitch of approximately 0.5 mm and a thread depth of approximately the same dimension. The thread is conical, preferably saw toothed-shaped, wherein the radial faces are provided in the axial pulling out direction and the conical faces are provided in the installing direction. The thread crests are preferably sharp-edged and free of burrs to facilitate the flowing in of the plastic material. The thread bottom may be acute angled or rounded.

The conical form of the insert and of the bore are identical. A preferred angle is four degrees. The diameter of the bore with respect to the insert is selected such that the insert can be freely placed in the bore until two to three rotations are then sufficient to firmly install the insert in the work-piece. Preferably the head face of the insert is then aligned to the surface of the work-piece. In the following description of an embodiment a number of dimensions is stated. To avoid restricting the invention to definite dimensions it should be understood that the thread may be defined with respect to the thread depth which coarsely corresponds to the indentations caused when axially knurling or diamond knurling a surface in accordance with the general knowledge of the skilled person.

Preferably the threaded insert is composed of brass.

Tests have shown that the installment by screwing in yields substantially increased axial pullout forces. Furthermore the torque which can be applied to the insert is substantially higher when screwing in rather than melting in. However, even when using heat for installment the insert according to the invention shows higher pull out forces and higher locking torques than the known insert according to German No. 23 55 166.

DESCRIPTION OF AN EMBODIMENT

Figure 2:
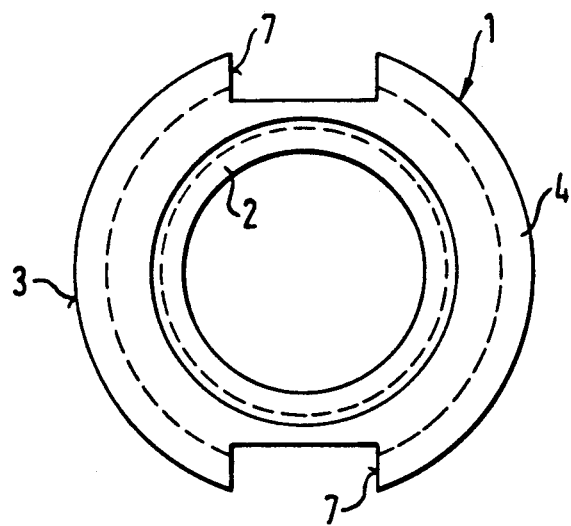

The invention will now be described in more detail and by way of example with reference to the accompanying drawings, in which FIG. 1 shows an insert according to the invention partially in side elevation and partially in section and FIG. 2 shows a top plan view of the insert of FIG. 1.

A metallic threaded insert 1 has a body with an internal thread 2 for a bolt. The outer face 3 of the insert has a conical form, wherein the angle is preferably four degrees as illustrated. Preferably, the length of the insert is greater than its maximum outer diameter.

A continuous conical special thread 4 is provided on the outer face 3 of the conical insert. This thread is defined by a fine thread of a relatively small pitch, which preferably is in the region of 0.5 mm. The side angle of the thread profile is less than 50 degrees, preferably about 45 degrees. Accordingly the depth of the thread is about 0.5 mm. From this it should be understood that the thread defines a fairly fine profile. As shown in FIG. 1 at least two thirds of the length of the insert 1 is freely received in the plane bore 5 of a plastic work-piece 6. The installing operation is finished when the full length of the insert is embedded in the plastic material. For installment in brittle plastic material the insert is provided in the axial direction with a pair of continuous cutting slot 7 which are not necessary for soft plastic material.

Furthermore a radial flange may be integrally formed on the head face of the insert having the larger diameter. Below the flange a sealing ring is inserted in an annular groove at the outer face 3.

I claim:

1. A threaded insert adapted to be installed in an unthreaded conical bore in a workpiece formed of plastic material, said insert comprising: a body having a conical outer face with substantially the same conical angle as the conical bore in the workpiece, said conical angle being approximately 4°, said conical outer face having formed therein fine sawtooth-shaped screw threads each having a substantially radial face and a conical face, said screw threads having a pitch and a depth which are substantially the same, and said conical outer face having a maximum outer diameter greater than that of the bore in the workpiece by an amount such that in installing the insert in the bore the spaces between the threads are substantially filled by the plastic material of the work-piece wherein the radial faces of the threads are disposed in the pulling out direction and the conical faces of the threads are disposed in the installing direction.

2. The threaded insert of claim 1, wherein the angle between the conical face of a thread and the radial face of an adjacent thread is approximately 45°.

3. The threaded insert of claim 2, and further comprising continuous cutting slots provided in the axial direction of the thread.

4. The threaded insert of claim 1, wherein the thread pitch and the thread depth are each approximately 0.5 mm.

5. The threaded insert of claim 1, and further comprising continuous cutting slots provided in the axial direction of the thread.

6. The threaded insert of claim 5, wherein said body has an internally threaded axial bore therethrough.

7. The threaded insert of claim 1, wherein said body has an internally threaded axial bore therethrough.

* * * * *

UNITED STATES PATENT AND TRADEMARK OFFICE
CERTIFICATE OF CORRECTION

PATENT NO. : 5,131,795
DATED : July 21, 1992
INVENTOR(S) : Klaus Kobusch

It is certified that error appears in the above-identified patent and that said Letters Patent is hereby corrected as shown below:

On the Title page, item [56];
    References Cited --

"H339,218" should be --4,339,218--.

Signed and Sealed this

Thirty-first Day of August, 1993

Attest:

BRUCE LEHMAN

Attesting Officer

Commissioner of Patents and Trademarks